H. J. PERKINS.
UNIVERSAL JOINT.
APPLICATION FILED JAN. 22, 1917.

1,250,349.

Patented Dec. 18, 1917.

Inventor
Harry J. Perkins
By Moulton & Livreaux
Attorneys.

UNITED STATES PATENT OFFICE.

HARRY J. PERKINS, OF GRAND RAPIDS, MICHIGAN.

UNIVERSAL JOINT.

1,250,349.   Specification of Letters Patent.   Patented Dec. 18, 1917.

Application filed January 22, 1917. Serial No. 143,694.

*To all whom it may concern:*

Be it known that I, HARRY J. PERKINS, a citizen of the United States of America, residing at Grand Rapids, in the county of Kent and State of Michigan, have invented certain new and useful Improvements in Universal Joints; and I do hereby declare the following to be a full, clear, and exact description of the invention, such as will enable others skilled in the art to which it appertains to make and use the same.

This invention relates to a universal joint and has for its object and purpose the simplification of construction of devices of this character and especially in the lubrication of the same whereby a very inexpensive yet efficient joint may be produced without the complicated lubricant containers heretofore necessary thereby reducing the number of parts and the expense of making the joint very materially.

For an understanding of the invention reference may be had to the accompanying drawings in which, Figure 1 illustrates in side elevation the various parts which are used in the make up of a preferred type of joint.

Like reference characters refer to like parts throughout the several views of the drawings.

Figure 1:
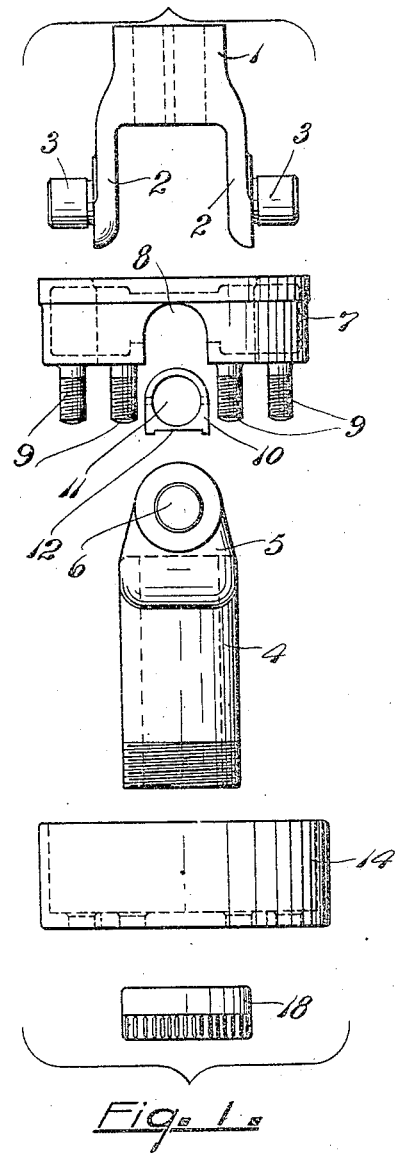
Figure 3:
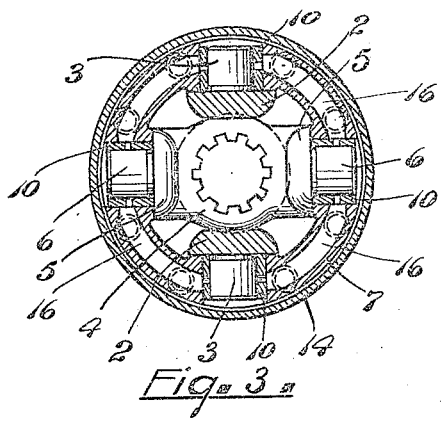
Fig. 3 is a section on the line 3—3 of Fig. 2.
Figure 2:
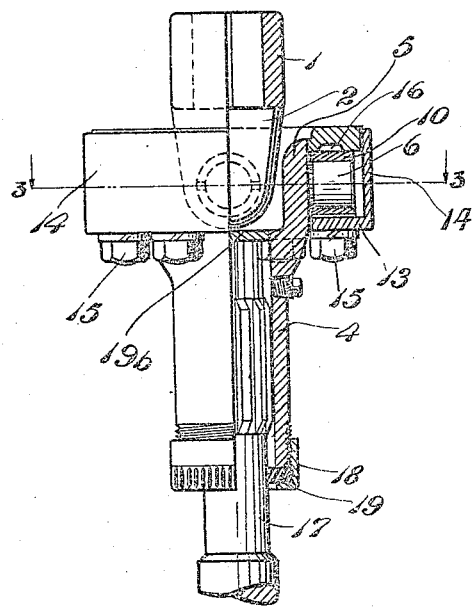
Fig. 2 is a partial sectional and side elevation of the assembled joint.

In the construction of the joint a member 1 is provided which at one end is divided making the spaced forks 2 projecting outwardly from which are trunnions 3. Similarly there is provided opposite to the member 1 a member 4 similarly divided to make spaced forks 5 from each of which a trunnion 6 projects outwardly. Members 1 and 4 are the driving and driven members of the joint and are located with respect to each other in the assembled joint so that trunnions 3 lie in a plane at right angles to the trunnions 6. A connecting member is interposed between the driving and driven members comprising an annular casting 7 which in one side is fashioned with four slots or recesses 8 located 90 degrees from each other, while projecting from said member 7 between the slots are a plurality of screw threaded studs 9. Each slot 8 is adapted to receive a bushing 10 through which a circular opening is formed of a size to loosely receive a trunnion 3 or 6. The outer surface of each bushing 10 is substantially a plane surface as indicated at 12.

In the assembly of the joint one of the bushings 10 is placed over each of the trunnions 3 and the member 1 is passed through the opening in member 7 so that the bushings seat in opposite slots 8. After this is done a bushing 10 is placed over each trunnion 6 and said bushings entered into the slots 8 which are located in a plane at right angles to the plane of the slots which receive the trunnions 3. To secure the parts as thus assembled together a cup-like member having a base 13 and an annular flange 14 is passed over the member 4 seating against the plane surfaces of the bushings 10 with studs 9 passed through openings in the base 13. Nuts 15 are threaded on the parts together. The annular flange 14 covers the ends of the trunnions and substantially the entire curved surface of the member 7. Member 7 is interiorly cored as indicated at 16 and a lubricant is held therein passing through suitable openings as indicated in the bushings 10 to the trunnions 3 or 6 for the lubrication of the joint. The member 4 is interiorly bored and splined to receive a shaft 17 therein, the usual cap 18 and washer 19 closing one end of member 4 while at the opposite end a plate 19$^b$ is positioned serving to retain the lubricant contained within the member 4.

The joint structure disclosed is of very simple construction and requires no inclosed casing to contain the lubricant for the joint. It may be manufactured at a very low cost and is especially strong, durable, and efficient.

I claim:—

1. In a universal joint, driving and driven members positioned end to end and at their adjacent ends provided with outwardly projecting trunnions, a ring surrounding the adjacent ends of said members and having recesses in one side thereof, threaded studs projecting from the ring between the recesses, bushings around said trunnions seated in the recesses, a cup-like member seated against said side of the ring and the bushings, the studs passing through the base thereof and the flange of said cup-like member covering the outer curved surface of the ring, and nuts screwed on to said studs against the base of said member, substantially as described.

2. In a universal joint, driving and driven members positioned end to end with adjacent ends of said members provided with outwardly projecting trunnions, a hollow ring surrounding the adjacent ends of said members and having recesses formed in one side thereof, threaded studs projecting from the ring between the recesses, the recesses being in communication with the interior openings in the ring, bushings around the trunnions and seated in the recesses, said bushings having holes to pass lubricant to the trunnions from the interior of the ring, a cup-like member seating against the side of the ring and covering said side and the outer curved surface thereof, said studs passing through said cup-like member, and nuts on said studs, substantially as described.

In testimony whereof I affix my signature.

HARRY J. PERKINS.